A. J. COBB.
WIND-WHEEL.
No. 189,700. Patented April 17, 1877.
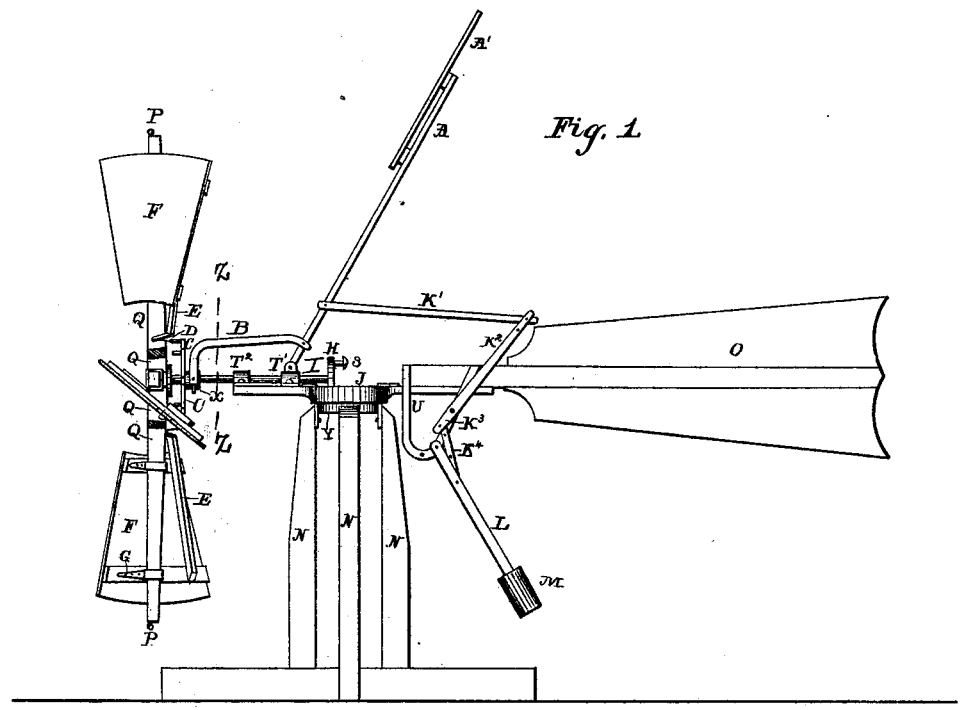
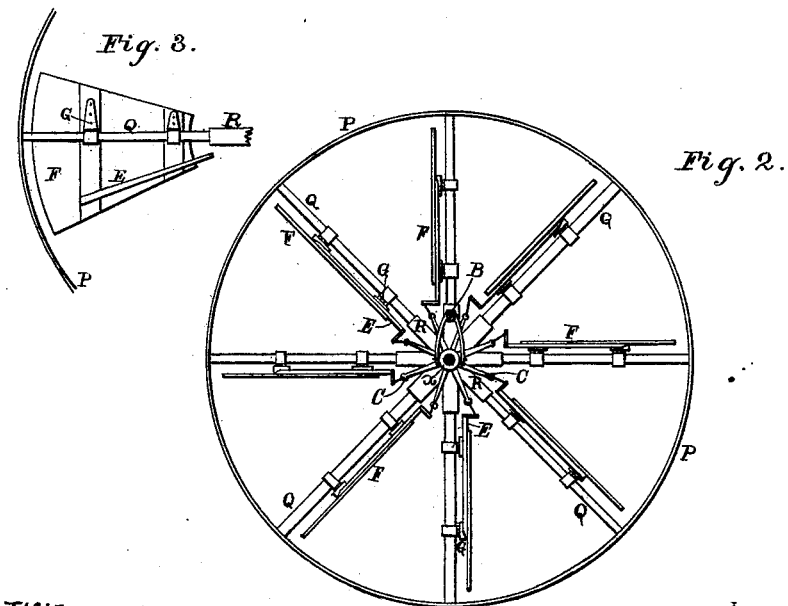

UNITED STATES PATENT OFFICE.

AMOS J. COBB, OF BUCYRUS, OHIO.

IMPROVEMENT IN WIND-WHEELS.

Specification forming part of Letters Patent No. 189,700, dated April 17, 1877; application filed January 25, 1877.

*To all whom it may concern:*

Be it known that I, AMOS J. COBB, of the town of Bucyrus, county of Crawford, and State of Ohio, have invented certain new and useful Improvements in Automatic Wind-Engines, useful for running machinery by the force of the wind, but more especially for pumping water, of which the following is a full, clear, and exact description, reference being had to the accompanying drawing, in which—

Figure 1 is a side view of the windmill. Fig. 2 is a rear view of the windmill, taken through the line $z\ z$. Fig. 3 is a detail view of one of the sails.

My invention has for its object the improvement of engines operated by the force of the wind, used for running various kinds of machinery, and especially for pumping water. It consists, first, in attaching the fans to the frame-work or arms by hinges at either end, and one-third the distance across the fan from either edge of the same, so they all be attached in the same manner, and, by means of arm-governors, thimble, and connecting-rod, to connect said fans with the regulator; second, in connecting the regulator to the weight-rod by means of the connecting-levers.

By this means the fans are acted upon and held in position by the weight acting on them through the regulator, the office of the regulator being to vary the position of the fans to the wind-line. For instance, a heavy wind raises the weight, depresses the regulator, which draws the fans with their shorter edge to the direction of the current, and as the fans then present less obstruction to the wind passing or glancing from their surfaces, the speed of revolution will be kept at a low rate; but when the current of air again slacks its speed the pressure upon the regulator is less, and it rises, lifted by the weight, the fans stand nearly square across the line of the current, and the speed of revolution is kept up at a uniform rate, as hereinafter more fully set forth.

In the accompanying drawing, F represents the fans, eight in number. However, there is no special limit to the number of fans, except, perhaps, that of convenience. G are ordinary strap-hinges, which attach the fans to the arms Q. These arms are eight in number, and are secured by screws or bolts to the hub R. The hub has eight sockets of sufficient size to receive the arms. The other ends of the arms are attached, by means of screws or bolts, to the strengthening-band P. This band is made of heavy strap-iron, either in one circular piece or in sections, as may be required.

Extending across the battens of the fans, and on or near the edge, which extend farther beyond the arms aforesaid, and bolted or otherwise securely fastened to said battens, are attached the fan-governors E. They extend beyond the inner end of the fan, and upon the end of each of these fan-governors a piece of strap-iron, bent at right angles to the flat surface of the fans.

By means of the thimble-rods D they are attached to the thimble-arms C. This thimble $x$ and thimble-arms are of cast-iron, and I prefer to have them cast all in one piece. The thimble $x$ is made to play back and forth upon the shaft I, and upon the end of this shaft are firmly secured the hub and arms aforesaid. The regulator A is attached to the thimble $x$ by means of the connecting-rod B, and by means of a groove cut in the thimble, it (the thimble) is allowed to revolve with the fans and shafts, while the connecting-rod rides in this groove.

The regulator aforesaid is attached to the weight M and weighted lever L by means of the levers $k^1$, $k^2$, $k^3$, and $k^4$, respectively, which levers are attached to the bed-plate J and an elbow (seen at U) by means of bolts.

The bed-plate J is of cast-iron. At one end are two bolts, $T^1\ T^2$, through which extends the shaft I; at the other is secured the tail or vane O. The center of the bed-plate swells out, and a circular opening is made through it. The end of the shaft extends to the center of this opening, and upon this end of the shaft are secured the crank H and pin S, from which power is communicated. This bed-plate rests upon an under bed-plate, Y, upon which the upper bed-plate revolves; and to secure it from being thrown off, clasps fastened to the upper overlap the under bed-plate, but so as not to interfere with its free revolution.

The whole machine rests upon and revolves upon the under bed-plate Y, which is firmly bolted to the frame-work.

The tail O or vane is bolted to the bed-plate, and has for its office to keep the fans in proper position before the wind. It, as well as the fans, is made of thin strips of pine or other light wood, nailed or otherwise firmly secured to battens. The wing of the regulator A' is made of like material. The fans F are made in the form of arcs of a common circle, each fan being one-eighth of said arc. They are cut away in a circular form at the inner end, so as to allow room for attaching the fan-governors E, and to turn upon their hinges G with freedom.

By an examination of the foregoing it will be seen that the regulator A and weight M act in opposition to each other, and that the speed of revolution of the fans depends upon the force of the current of air acting upon their surfaces; that the nearer the fans stand at right angles to the current of air, so long as they are not at perfect right angles thereto, the greater will be the speed of revolution, but that the same force which tends to increase the speed of revolution also, at the same time, depresses the regulator and raises the weight, thus keeping the speed even; that if it is desired to run at greater speed the weight must be moved farther down upon the weight-rod, and that the tail or vane will keep the fans in line with the wind.

Having now described my invention, what I claim is—

1. The regulator A and wing A', in combination with the weight M, weighted lever L, and levers $k^1$, $k^2$, $k^3$, and $k^4$, attached as described, and for the purpose of holding the regulator A in proper position, as aforesaid, dispensing with springs and other devices for making the machine automatic.

2. The movable thimble $x$, provided with arms C, in combination with the fans F, hung upon arms Q by hinges, and, by means of the fan-governors E and thimble-rods D, thimble $x$, and connecting-rod, attached to said regulator A, so that the position of the fans F depends upon the position of the regulator, which latter is governed by the force of the weight M, acting through the levers $k^1$ $k^2$ $k^3$ $k^4$, which tends to sustain it in a perpendicular position, and the force of the wind acting upon the regulator A through the obstruction of the wing A' thereto, which tends to force the regulator to a horizontal position, in the manner and for the purpose afore described.

3. The fans F, attached, by means of strap-hinges, to the stationary arms Q, so that the fans swing laterally, and either present their whole flat surfaces at right angles to the wind-line, or stand at any less angle thereto, and when said regulator is in a horizontal position, said fans present only their lateral edges to said wind-line, and said fans so hung in combination with the regulator A, connecting-rod B, thimble $x$, thimble-arms C, thimble-rods D, and fan-governors E, secured to fans F, in the manner and for the purpose described.

AMOS J. COBB.

Witnesses:
L. C. COBB,
A. WICKHAM.